United States Patent
Warshavsky et al.

(10) Patent No.: US 7,376,959 B2
(45) Date of Patent: May 20, 2008

(54) METHOD AND SYSTEM FOR OUTBOUND WEB SERVICES

(75) Inventors: Alexander S. Warshavsky, San Francisco, CA (US); Sanjin Tulac, Mountain View, CA (US); Chandamouli Mahadevan, Mountain View, CA (US)

(73) Assignee: Siebel Systems, Inc., San Mateo, CA (US)

( * ) Notice: Subject to any disclaimer, the term of this patent is extended or adjusted under 35 U.S.C. 154(b) by 844 days.

(21) Appl. No.: 10/397,668

(22) Filed: Mar. 25, 2003

(65) Prior Publication Data
US 2007/0204279 A1 Aug. 30, 2007

Related U.S. Application Data

(60) Provisional application No. 60/392,110, filed on Jun. 27, 2002.

(51) Int. Cl.
*G06F 13/00* (2006.01)
(52) U.S. Cl. .................. 719/330; 709/201; 709/203
(58) Field of Classification Search ................ 719/313, 719/330; 709/201, 203, 227, 230, 237
See application file for complete search history.

(56) References Cited

U.S. PATENT DOCUMENTS 6,985,939 B2 * 1/2006 Fletcher et al. ............. 709/223

OTHER PUBLICATIONS

Maximilien et al., Reputation and endorsement for web services, ACM SIGecom Exchanges, vol. 3 , Issue 1 Winter, 2002, pp. 24-31.*

Takase et al., XML digital signature system independent of existing applications, Applications and the Internet (SAINT) Workshops, 2002. Proceedings. 2002 Symposium on, Jan. 28-Feb. 1, 2002 pp. 150-157.*

* cited by examiner

*Primary Examiner*—Wei Zhen
*Assistant Examiner*—Andy Ho
(74) *Attorney, Agent, or Firm*—Campbell Stephenson LLP

(57) ABSTRACT

A method and system for client applications to invoke the services of server applications. A business service system allows a user of a client application to specify the provider of a business service and to specify the communications protocols and transport mechanisms to be used when invoking such business services. The business service system provides a business service proxy that is invoked by client applications when using a business service. The business service proxy uses a mapping of web service to business service to send a request to the server application, which implements the business service in an appropriate format and using an appropriate transport mechanism. The mapping may be customized to point to a different implementation of the business service. The mapping may point to a business service that executes remotely from or locally to the client application.

46 Claims, 10 Drawing Sheets

METHOD AND SYSTEM FOR OUTBOUND WEB SERVICES

CROSS-REFERENCE TO RELATED APPLICATION(S)

This application claims the benefit of U.S. Provisional Patent Application Ser. No. 60/392,110, filed Jun. 27, 2002 which is incorporated herein in its entirety by reference.

BACKGROUND

The described technology relates generally to client applications invoking services provided by server applications.

Many business applications need to use services provided by various business services (e.g., credit checking services and accounting services). These business services may be provided by service providers that are different from the organization that develops the business application. For example, a developer may sell a customer relationship management application that needs to use a credit checking service when qualifying a new customer. Credit checking services may be provided by a service provider that is not affiliated with the developer. Traditionally, the developer of such business applications would obtain an interface to the business service and integrate the interface into the business application. The interface may be provided as a module that is statically or dynamically linked into the business application as needed. When the business application needs to have the service performed, the business application invokes the interface, passing the required input arguments and receiving output arguments in return. For example, an interface to a credit checking service may have the name of the company as an input argument and a numerical credit rating value as an output argument. When such business applications are sold or licensed to customers, the customers typically are restricted to using the business services of service providers that the developer of the business application has selected.

Many customers, however, would like to have the flexibility to select their own service provider. For example, a customer may have purchased multiple business applications from different developers that all require similar business services. The customer would typically like to have the same service provider provide similar services for all their business applications, rather than having a different developer-specified service provider for each business application. In addition to pre-selecting the service providers for business applications, the developers of the business applications and the service providers may also specify the communications protocols and transport mechanisms that are supported by the provided business services. From a customer's perspective, multiple communications protocols and transport mechanisms are difficult to support.

It would be desirable to have a mechanism that would allow a customer of business applications the flexibility to select a desired service provider for providing services and to select communications protocols and transport mechanisms for use in communicating with such service providers.

DETAILED DESCRIPTION

Figure 1:
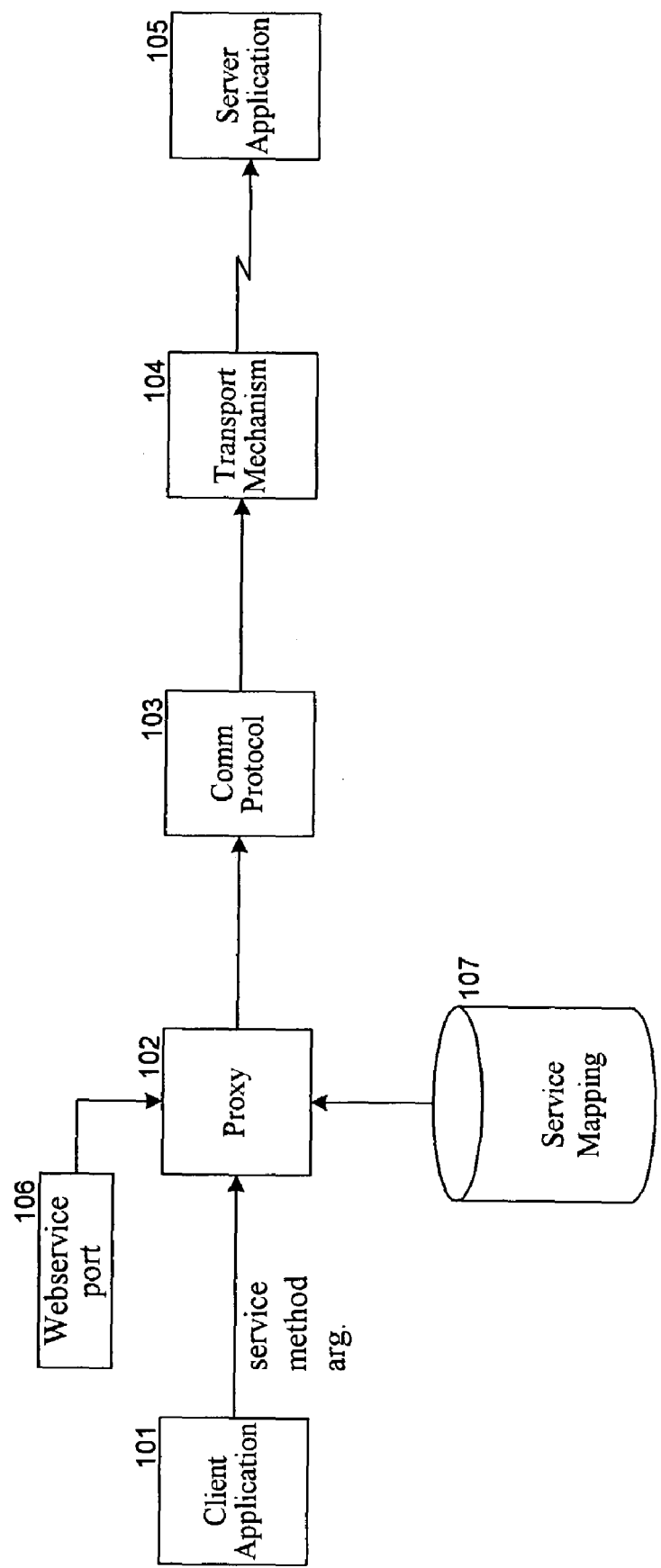
FIG. 1 is a block diagram illustrating the invocation by a client application of a business service implemented by a server application in one embodiment.

A method and system for client applications to invoke the services of server applications is provided. In one embodiment, the business service system allows a user of a client application to specify the provider of a business service and to specify the communications protocols and transport mechanism to be used when invoking such a business service. The business service system allows business services to be defined as web services (described below). The business service system provides a business service proxy that is invoked by client applications when using a business service. The business service proxy uses a mapping of web service to business service to send a request to the server application, which in turn implements the business service, in an appropriate format and using an appropriate transport mechanism. When the business service proxy receives a response from the server application, it provides any return arguments to the client application. In this way, the client applications can invoke a web service in a manner that is similar to how business services are invoked. The conversion from business service format to web service format is accomplished by the business service system based on metadata that describes how to perform the conversion.

The business service system provides a mapping of web service definitions to business service definitions. A business service definition defines a service, a method (or function) of that service, and arguments of the method. The arguments may include a specification of the data type of the input and output arguments for the method. A client application passes actual arguments to a business service proxy in a format defined by a business service definition. A web service has associated communications information that may include a communications protocol, a transport mechanism, and an address that is to be used when communicating with the server application that implements the business service. To access a business service, a client application invokes a business service proxy passing an indication of the service, the method to be invoked, and the actual arguments. An indication of a web service is also provided to the business service proxy (e.g., via configuration information of the client application). The business service proxy retrieves the communications information of the web service. The business service proxy also retrieves the business service definition for the passed service and method. The business service proxy generates a service request that identifies the service, the method, and the marshaled arguments. The service request is generated in accordance with the business service definition and the communications protocol. The service request is transported to the address of the web service via the transport mechanism of the web service. The web service may be provided by a computer system other than the computer system that is executing the client application. In such a case, the two computer systems may be connected via a communications channel such as the Internet. Alternatively, the web service and the client application may be executing the same computer system, and the transport mechanism may be a local mechanism. When the business service proxy receives a response from the server application, it unmarshals the arguments and returns them to the client application.

In one embodiment, a web service may have multiple ports associated with it. Each port may identify different communications information that may be used with the web service. In this embodiment, a web service and a port are provided to the business service proxy. The business service proxy uses the port to retrieve the appropriate communications information for communicating with the server application. In an alternate embodiment, a communications protocol, a transport mechanism, and associated binding information may be provided by a user or customer of the client application. The providing of a communications protocol, a transport mechanism, and binding information may allow a customer to invoke services of, for example, a legacy application that uses non-standard communications. In this way, customers of client applications can use ports to specify different communications information and may provide their own transport mechanism and binding information.

FIG. 1 is a block diagram illustrating the invocation by a client application of a business service implemented by a server application in one embodiment. The client application 101 invokes business service proxy 102, passing the identification of a service and method and passing one or more actual arguments. A service may identify a group of related methods. (A service is sometimes referred to as an "interface.") For example, a service for storing customer information may include a method to add a new customer, a method to delete a customer, a method to update customer information, and so on. The business service proxy is provided the identification of a web service and a port via configuration information 106. The business service proxy uses the web service and the port to retrieve communications information (e.g., defining a communications protocol and transport mechanism for communicating with the server application) and service information (e.g., defining the data types of the passed arguments) from the service mapping 107. A customer may change the configuration information dynamically to specify a different implementation (e.g., a different server application) for a business service. The business service proxy uses the service information to marshal the identification of the service and method and the actual arguments in accordance with the communications information and the service information. For example, the service information may specify a component (e.g., C++ object) for converting an argument of a complex data type into a format that is consistent with the communications information. In one embodiment, the communications protocol of the communications information may be the Simple Object Access Protocol ("SOAP"). SOAP defines a standard envelope containing a header and body and standard encoding rules that specify the mapping of data based on an abstract data type (e.g., array) into an extensible Markup Language ("XML") format. SOAP also specifies how to make remote procedure calls ("RPC") using SOAP messages. The term "web service" generally refers to a service provided by exchanging XML messages using SOAP. One skilled in the art will appreciate that the term "web service" as used in this description refers to any service that can be provided by exchanging messages in a variety of formats using various protocols and is not limited to exchanging XML messages using SOAP. The transport mechanism of the communications information may be specified as the Hyper Text Transfer Protocol ("HTTP"). The address of the communications information may be a Uniform Resource Locator ("URL") identifying the location of the server application. The business service proxy may invoke the appropriate communications protocol modules 103 and transport mechanism modules 104 to encode the service request and to transmit it to the server application 105.

Figure 2:
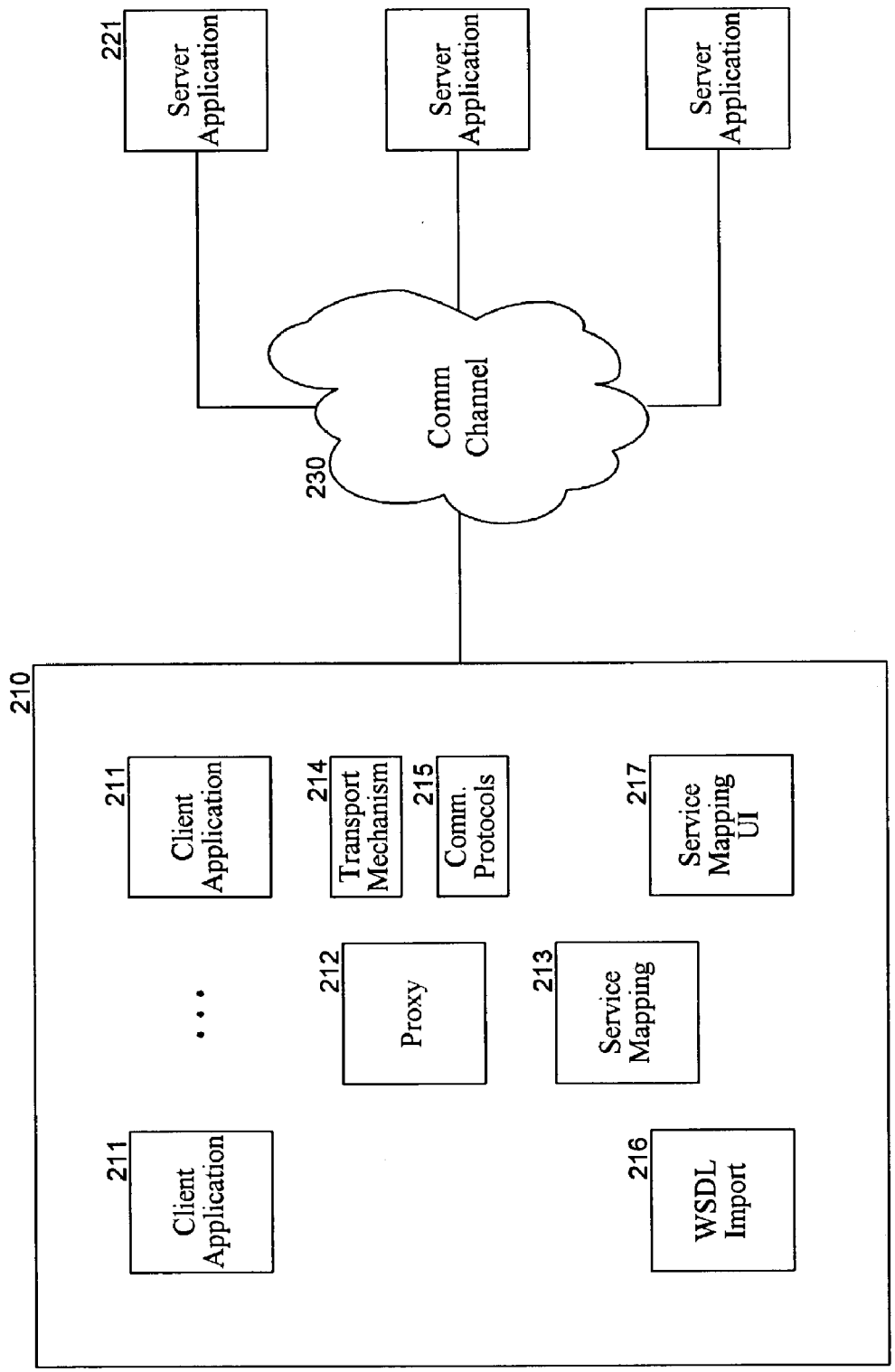
FIG. 2 is a block diagram illustrating components of the business service system in one embodiment.

FIG. 2 is a block diagram illustrating components of the business service system in one embodiment. Computer system 210 may include client applications 211, a business service proxy 212, service mapping 213, transport mechanisms 214, communications protocols 215, a WSDL import component 216, and service mapping user interface 217. The client applications invoke the services of server applications 221 via the business service proxy. The computer system may communicate with the server applications via a communications channel 230, such as the Internet. A customer of a client application or developers of client applications and server applications may populate the service mapping using the WSDL import component or the service mapping user interface. The WSDL import component may import a description of a web service (a WSDL document) described using the Web Services Description Language ("WSDL"). WSDL provides an XML format for describing network services as a set of endpoints operating on messages containing either document-oriented or procedure-oriented information. The operations and messages are described abstractly, and then bound to a concrete network protocol and message format to define an endpoint. Related concrete endpoints can be combined into abstract endpoints (services). WSDL is extensible to allow description of endpoints and their messages regardless of message formats or network protocols. WSDL is described in the document entitled "Web Services Description Language (WSDL) 1.1" published by W3C as a Note on Mar. 15, 2001, which is hereby incorporated by reference. The WSDL import component inputs a WSDL document and populates the service mapping to correspond to the defined services. The service mapping user interface provides a user interface through which a user can populate the service mapping directly. The service mapping user interface may allow a user to define services that cannot be defined using a WSDL document.

The computers upon which the components of the business service system executes may include a central processing unit, memory, input devices (e.g., keyboard and pointing devices), output devices (e.g., display devices), and storage devices (e.g., disk drives). The memory and storage devices are computer-readable media that may contain instructions that implement the business service system. In addition, the data structures and message structures may be stored or transmitted via a data transmission medium, such as a signal on a communications channel. Various other communications channels may be used other than the Internet, such as a local area network, a wide area network, or a point-to-point dial-up connection. In addition, in some embodiments, a client application and a server application may execute on the same computer system and communicate via interprocess communications mechanisms. As used in this description, the term "application" generally refers to a computer program that is separately executable by or separately schedulable by a computer system. For example, a computer program that can be loaded and executed as a process independent of other computer programs is an application. Also, a computer program that executes as a separate thread within another computer program may be an application. In contrast, an object such as a C++ object that is instantiated during execution of a computer program would generally not be considered an application.

Figure 3:
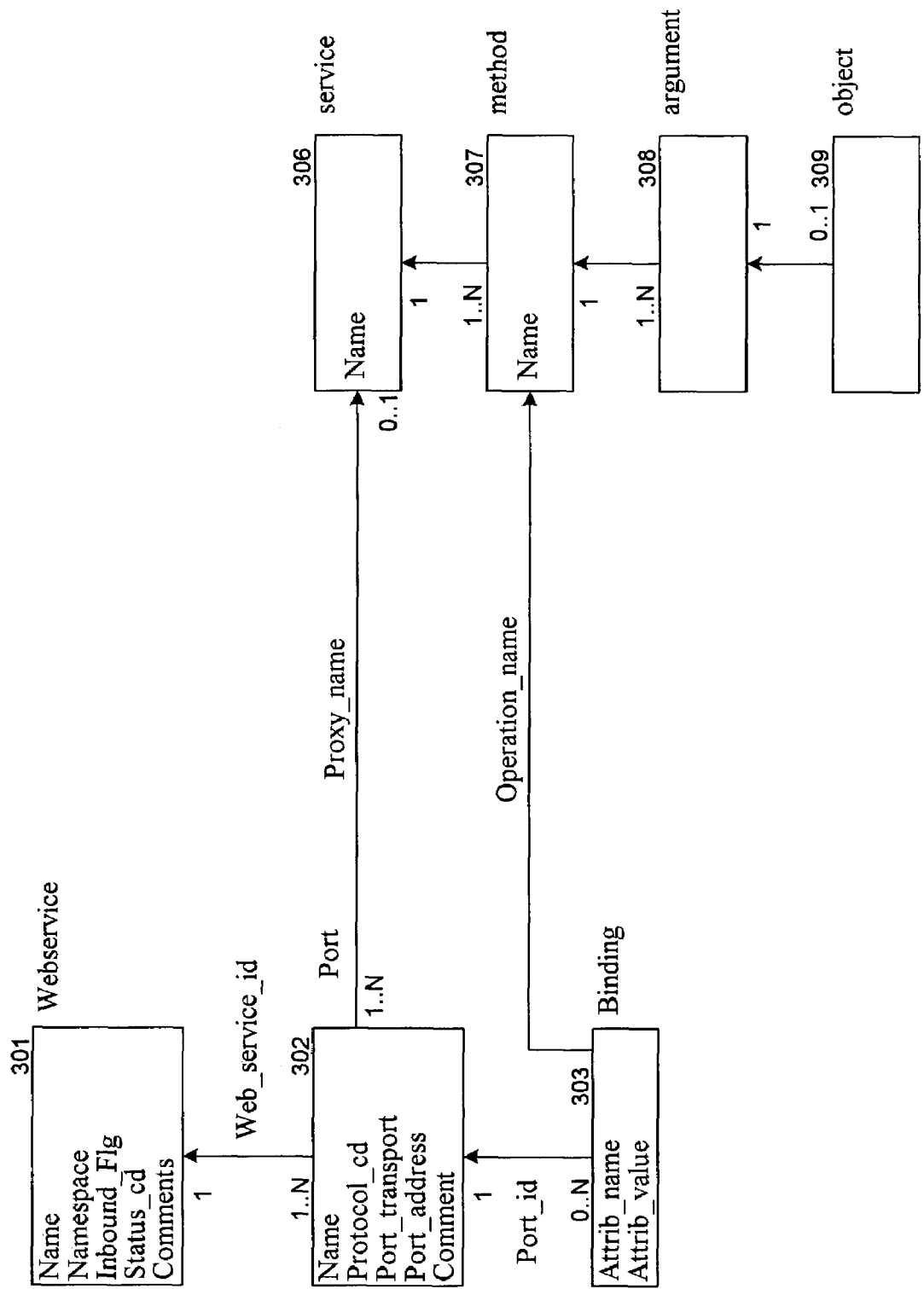
FIG. 3 is a block diagram illustrating a data model for service mapping in one embodiment.

FIG. 3 is a block diagram illustrating a data model for the service mapping in one embodiment. The service mapping is populated based on the WSDL definition of a web service or based on user interaction with the service mapping user interface component. The data model includes a web service table 301, a port table 302, a binding table 303, a service table 306, a method table 307, an argument table 308, and an object table 309.

Each of the illustrated tables contains the names of fields (or columns) within the table. The arrows connecting the tables represent foreign keys. The web service table includes a name field, a namespace field, an inbound flag, a status code, and a comments field. The combination of name, namespace, and inbound flag is a key that uniquely identifies a record of the web service table. The name field represents the name of a web service. The namespace field represents the namespace associated with the web service. The inbound flag indicates whether the web service is a client-side or server-side service in the event the business service system supports inbound web service invocations. The status code indicates whether the web service is currently active or inactive.

The port table includes a name field, a protocol code field, a port transport field, a port address field, and a comments field. The combination of the web service table key and the name field of the port table uniquely identifies a record of the port table. The name field represents the name of a port. The protocol code field, port transport field, and port address field represent the corresponding information. The binding table includes an operation name field, an attribute name field, and an attribute value field. The combination of port table key, operation name, and the attribute name uniquely identifies the records of the binding table. The name and value pairs represent binding information. The service table includes a name field that corresponds to a business service associated with a port. The service table includes a name field that corresponds to the name of a method of a service. The argument table describes the arguments for the business service. The object table contains objects for accessing (e.g., serializing) arguments of complex data types.

Table 1 illustrates a mapping from a WSDL document to a service mapping in one embodiment. The format of WSDL constructs in this table is based on XML Xpath notation:
   <namespacePrefix:elementName>/
<elementName>@<attributeName>

TABLE 1

| WSDL Construct | Table | Column | Description and/or mapping rules |
|---|---|---|---|
| wsdl:definitions @targetNamespace | WEBSERVICE | NAMESPACE | |
| wsdl:service @name | WEBSERVICE | NAME | |
| wsdl:service/ documentation | WEBSERVICE | COMMENTS | |
| wsdl:service/ port @name | PORT | NAME | |
| wsdl:service/ port/ address @location | PORT | PORT_ADDRESS | |
| wsdl:binding @type | PORT | SERVICENAME | The business service system generates a unique name for a new business service. |
| wsdl:binding/ soap:binding @transport | PORT | PORT_TRANSPORT | http://schemas.xmlsoap.org/soap/ http => http |
| wsdl:binding/ soap:binding @style | PORT | PROTOCOL_CD | rpc => PROTOCOL_CD = "SOAP-RPC" document => PROTOCOL_CD = "SOAP-DOC" |
| wsdl:binding/ operation @name | BINDING | OPERATION_NAME | Same as portType/operation@name |
| wsdl:binding/ operation/ soap:operation @soapAction | BINDING | ATTRIB_NAME ATTRIB_VALUE | soapAction is imported and used for HTTP only (use not defined for MQ) |
| wsdl:portType @name Name | SERVICE | NAME | The name is the same as PORT.SERVICENAME. |
| wsdl:portType /operation @name | METHOD | NAME | |
| Wsdl:portType/ operation/ input@name | ARGUMENT | NAME | Argument |

TABLE 1-continued

| WSDL Construct | Table | Column | Description and/or mapping rules |
|---|---|---|---|
| Wsdl:portType/ operation/ output@name | ARGUMENT | NAME | |
| wsdl:message/ part | ARGUMENT | NAME | message@name+part@name |
| wsdl:message/ part @type | ARGUMENT | DATA TYPE | If Namespace = Local XSD (locally defined schema), then DataType = "Integration Object" else if Namespace is NOT Local (or Namespace = http://www.w3.org/2001/XMLSchema) DataType = "String/Number" (lookup from predetermined mappings for known schema types) |

Figure 4:
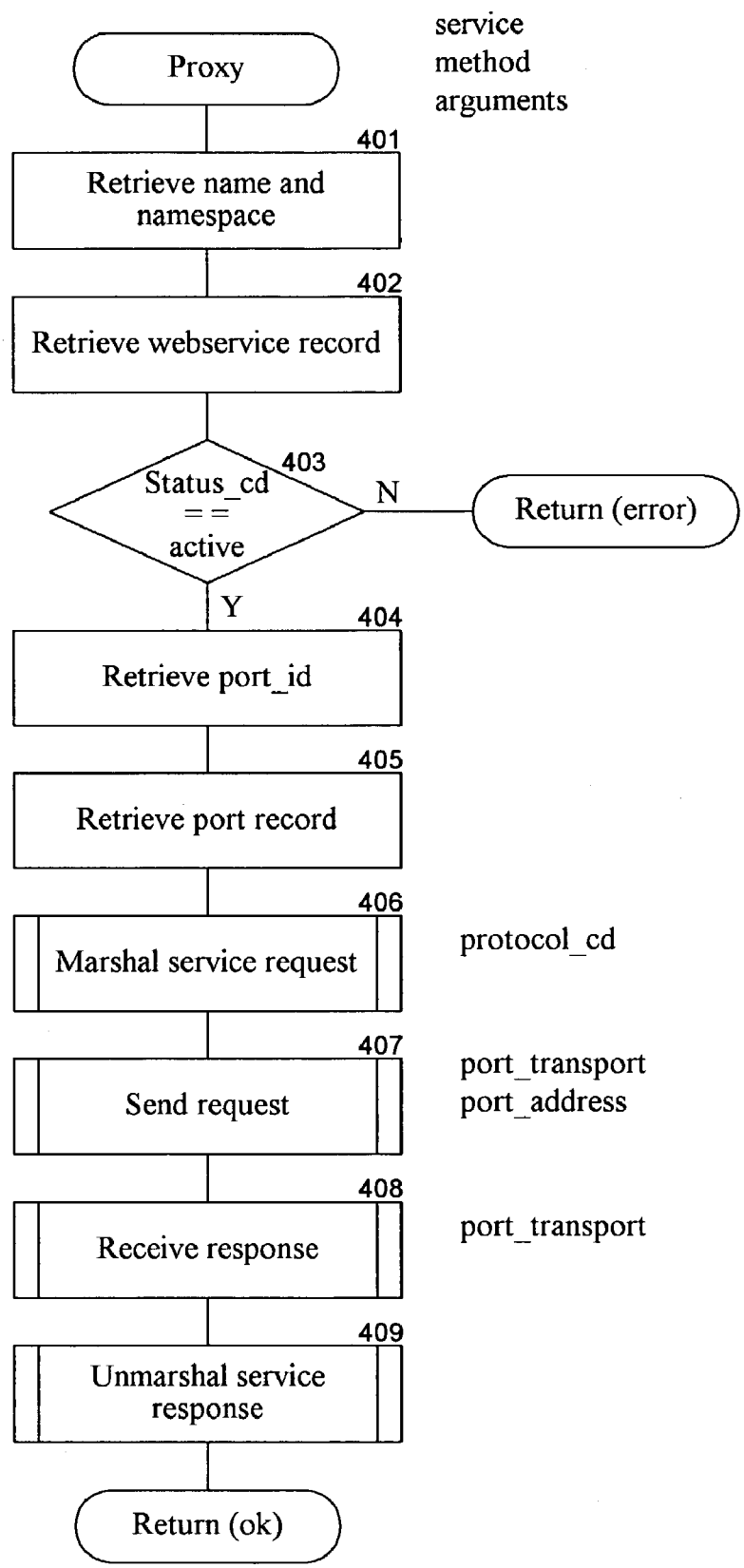
FIG. 4 is a flow diagram illustrating the processing of a generic business service proxy in one embodiment.

FIG. 4 is a flow diagram illustrating the processing of a generic business service proxy in one embodiment. The proxy is passed a service name, a method name, and input arguments and returns output arguments. The proxy can be used to invoke the services of any web service that can be defined in the service mapping. The proxy also has access to configuration information such as web service name, web service namespace, and port name. This configuration information may be overridden when the proxy is invoked in some embodiments. In block 401, the proxy retrieves the web service name and web service namespace configuration information. In block 402, the proxy retrieves the web service record for the retrieved web service name and web service namespace. In decision block 403, if the status code of the retrieved web service record indicates that the web service is active, then the proxy continues at block 404, else the proxy returns because the web service is not active. In block 404, the proxy retrieves the port name from the configuration information. In block 405, the proxy retrieves the port record corresponding to the web service name, web service namespace, and port name from the port table. In block 406, the proxy invokes a marshal service request function to marshal the service, method, and actual arguments into a service request in accordance with the protocol code of the port record and the argument definition of the argument table. The marshal service request function may also use information stored in the binding table. In block 407, the proxy invokes a send request function to send the service request that includes the marshaled information in accordance with the port transport and port address of the port record. The send request function may also use the information stored in the binding table. In block 408, the proxy invokes a receive response function to receive the response of the service sent via the port transport. In block 409, the proxy invokes an unmarshal service response function to unmarshal the service response in accordance with the protocol code and the definition of the arguments in the argument table. The proxy then returns.

Figure 5:
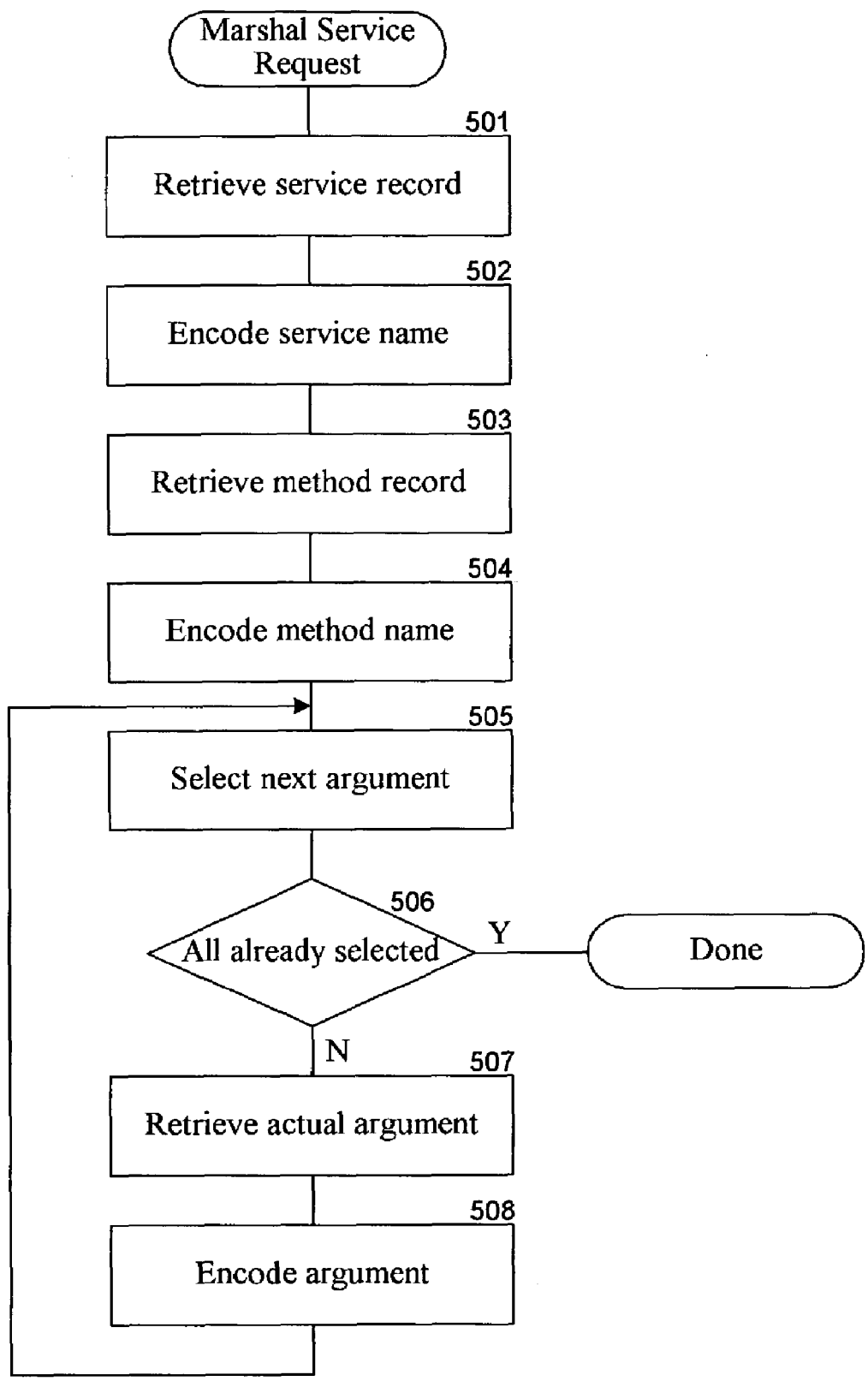
FIG. 5 is a flow diagram illustrating the processing of a marshal service request component in one embodiment.

FIG. 5 is a flow diagram illustrating the processing of a marshal service request component in one embodiment. The business service system may provide a different implementation of this component for each supported communications protocol. In such a case, the business service proxy invokes the component appropriate for the communications protocol specified by the web service and port. The component is passed an indication of the web service, namespace, port, service, method, and actual arguments. In block 501, the component retrieves the service record for the passed service from the service table. In block 502, the component encodes the service name according to communications protocol. In block 503, the component retrieves the method record for the passed method from the method table. In block 504, the component encodes the method name according to the communications protocol. In blocks 505-508, the component loops, encoding each of the actual arguments. In block 505, the component selects the next argument. In decision block 506, if all the arguments have already been selected, then the component returns, else the component continues at block 507. In block 507, the component retrieves an argument record from the argument table for the selected argument. In block 508, the component encodes the actual argument in accordance with the retrieved argument record and the communications protocol. The component may be programmed to encode simple data types (e.g., integers and strings). The component, however, may invoke objects of the object table to encode complex data types. These objects may be provided by developers of client and server applications. The component then loops to block 505 to select the next argument.

Table 2 is an example WSDL document in one embodiment. As indicated by the service tag (61-66), this WSDL document defines a web service named "Order Service" and a port named "Order Port." The binding tag (42-61) defines a service name, a port transport, a protocol code, a method name, and binding attributes.

TABLE 2

1. <?xml version="1.0" encoding="UTF-8"?>
2. definitions name="Order-service"
3.    targetNamespace="http://www.order.com/definitions/OrderRemoteInterface"

TABLE 2-continued

```
4.       xmlns="http://schemas.xmlsoap.org/wsdl/"
5.       xmlns:soap="http://schemas.xmlsoap.org/wsdl/soap/"
6.       xmlns:tns="http://www.order.com/definitions/OrderRemoteInterface"
7.       xmlns:xsd=http://www.w3.org/2001/XMLSchema
8.       xmlns:xsd1="http://www.order.com/schemas/OrderRemoteInterface">
9.       <types>
10.          <schema attributeFormDefault="qualified"
11.              elementFormDefault="qualified"
12.  targetNamespace="http://www.order.com/schemas/OrderRemoteInterface"
13.              xmlns="http://www.w3.org/2001/XMLSchema"
14.              xmlns:xsd1="http://www.order.com/schemas/OrderRemoteInterface">
15.              <complexType name="com.acme.order.Item">
16.                  <all>
17.                      <element name="shipDate" nillable="true" type="dateTime"/>
18.                      <element name="price" type="double"/>
19.                  </all>
20.              </complexType>
21.              <complexType name="com.acme.order.Order">
22.                  <all>
23.                      <element name="item" nillable="true"
24.  type="xsd1:com.acme.order.Item"/>
25.                      <element name="id" type="long"/>
26.                  </all>
27.              </complexType>
28.          </schema>
29.      </types>
30.      <message name="setItemRequest">
31.          <part name="newItem" type="xsd1:com.acme.order.Item"/>
32.      </message>
33.      <message name="setItemResponse">
34.          <part name="result" type="xsd1:com.acme.order.Order"/>
35.      </message>
36.      <portType name="Order">
37.          <operation name="setItem" parameterOrder="newItem">
38.              <input message="tns:setItemRequest" name="setItemRequest"/>
39.              <output message="tns:setItemResponse" name="setItemResponse"/>
40.          </operation>
41.      </portType>
42.      <binding name="OrderBinding" type="tns:Order">
43.          <soap:binding style="rpc"
44.  transport="http://schemas.xmlsoap.org/soap/http"/>
45.          <operation name="setItem">
46.              <soap:operation soapAction="" style="rpc"/>
47.              <input name="setItemRequest">
48.                  <soap:body
49.                      encodingStyle="http://schemas.xmlsoap.org/soap/encoding/"
50.                      namespace="http://tempuri.org/com.acme.order.Order"
51.  use="encoded"/>
52.              </input>
53.              <output name="setItemResponse">
54.                  <soap:body
55.                      encodingStyle="http://schemas.xmlsoap.org/soap/encoding/"
56.                      namespace="http://tempuri.org/com.acme.order.Order"
57.  use="encoded"/>
58.              </output>
59.          </operation>
60.      </binding>
61.      <service name="OrderService">
62.          <port binding="tns:OrderBinding" name="OrderPort">
63.              <soap:address
64.  location="http://eai1:8090/WebServiceTest/servlet/rpcrouter"/>
65.          </port>
66.      </service>
67.  </definitions>
```

Table 3 illustrates contents of a service mapping after the WSDL document of Table 2 has been imported.

TABLE 3

| Table | Column | Value |
|---|---|---|
| WEBSERVICE | NAMESPACE | http://www.order.com/definitions/OrderRemoteInterface |
| WEBSERVICE | NAME | OrderService |
| PORT | NAME | OrderPort |

TABLE 3-continued

| Table | Column | Value |
|---|---|---|
| PORT | PORT_ADDRESS | http://eai1:8090/WebServiceTest/servlet/rpcrouter |
| PORT | PROXY_NAME | Order |
| PORT | PORT_TRANSPORT | HTTP |
| PORT | PROTOCOL_CD | SOAP_RPC |
| BINDING | OPERATION_NAME | setItem |
| BINDING | ATTRIB_NAME =soapAction ATTRIB_VALUE =Action | NULL (since input is empty) |
| BINDING | ATTRIB_NAME =encodingStyle ATTRIB_VALUE =Style | encodingStyle="http://schemas.xmlsoap.org/soap/encoding/" |
| BINDING | ATTRIB_NAME =namespace ATTRIB_VALUE =Namespace | namespace="http://tempuri.org/com.acme.order.Order" |
| SERVICE | NAME | Order |
| METHOD | NAME | setItem |
| ARGUMENT | NAME | setItemRequest:newItem |
| ARGUMENT | DATA_TYPE | Integration Object (com.Acme.order.Item) |

Table 4 illustrates the information passed to the business service proxy to invoke the service defined by Table 3.

TABLE 4

```
PASSED PARAMETERS:
    SERVICENAME = Order
    METHODNAME = setItem
    SetItemRequest:newItem = Integration Object with
        shipDate=2002-06-13T00:00:00Z
        price=1234.56
CONFIGURATION INFORMATION:
    Web_service_name = OrderService
    Web_service_namespace = http://www.order.com/definitions/OrderRemoteInterface
    Web_service_port = OrderPort
RETURN PARAMETERS:
    SetItemResponse:result = Integration Object with
        id=111
        item (shipDate=2002-06-13T00:00:00Z, price=1000000.0)
```

Table 5 illustrates a service request generated for the information of Table 4.

TABLE 5

```
1.   <SOAP-ENV:Envelope xmlns:xsd="http://www.w3.org/2001/XMLSchema"
2.              xmlns:SOAP-ENV="http://schemas.xmlsoap.org/soap/envelope/"
3.              xmlns:xsi="http://www.w3.org/2001/XMLSchema-instance"
4.       SOAP-ENV:encodingStyle="http://schemas.xmlsoap.org/soap/encoding/">
5.       <SOAP-ENV:Body>
6.       <Acme:setItem xmlns:Acme="http://tempuri.org/com.acme.order.Order">
7.           <newItem xsi:type="ns0:com.acme.order.Item"
8.              xmlns:ns0="http://www.order.com/schemas/OrderRemoteInterface">
9.           <shipDate xsi:type="ns1:dateTime"
10.              xmlns:ns1="http://www.w3.org/2001/XMLSchema"
11.              xmlns="http://www.order.com/schemas/OrderRemoteInterface"
12.              xmlns:xsi="http://www.w3.org/2001/XMLSchema-instance">2002-06-
13.              13T00:00:00Z
14.           </shipDate>
15.           <price xsi:type="ns1:double"
16.              xmlns:ns1="http://www.w3.org/2001/XMLSchema"
17.              xmlns="http://www.order.com/schemas/OrderRemoteInterface"
18.              xmlns:xsi="http://www.w3.org/2001/XMLSchema-
19.           instance">1234.56
20.           </price>
21.         </newItem>
22.      </Acme:setItem>
```

TABLE 5-continued

```
23.      </SOAP-ENV:Body>
24.  </SOAP-ENV:Envelope>
```

Table 6 illustrates a service response returned by a server application that received the request of Table 5.

TABLE 6

```
1.   <?xml version="1.0" encoding="UTF-8" ?>
2.   <SOAP-ENV:Envelope xmlns:SOAP-
3.           ENV="http://schemas.xmlsoap.org/soap/envelope/"
4.           xmlns:xsi="http://www.w3.org/2001/XMLSchema-instance"
5.           xmlns:xsd="http://www.w3.org/2001/XMLSchema">
6.      <SOAP-ENV:Body>
7.      <ns1:setItemResponse xmlns:ns1="http://tempuri.org/com.acme.order.Order"
8.      SOAP-ENV:encodingStyle="http://schemas.xmlsoap.org/soap/encoding/">
9.           <result
10.          xmlns:ns2="http://www.order.com/schemas/OrderRemoteInterface"
11.          xsi:type="ns2:com.acme.order.Order">
12.             <item xsi:type="ns2:com.acme.order.Item">
13.                <shipDate xsi:type="xsd:dateTime">
14.                2002-06-13T00:0:00Z
15.                </shipDate>
16.                <price xsi:type="xsd:double">1000000.0</price>
17.             </item>
18.             <id xsi:type="xsd:long">111</id>
19.          </result>
20.      </ns1:setItemResponse>
21.     </SOAP-ENV:Body>
22.  </SOAP-ENV:Envelope>
```

Figure 6:
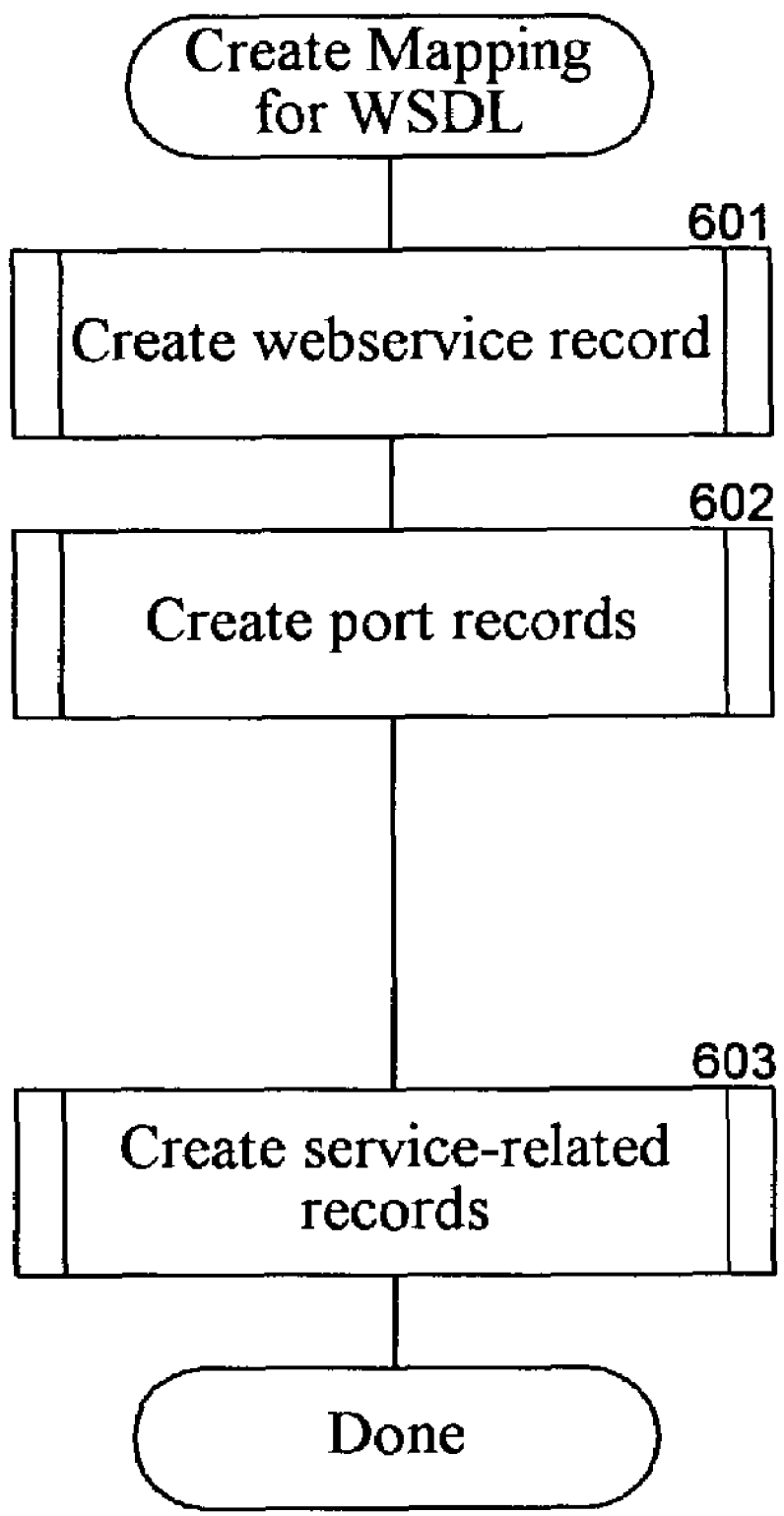
FIG. 6 is a flow diagram illustrating the overall processing of the WSDL import component in one embodiment.

FIGS. 6-10 are flow diagrams illustrating the processing of the WSDL import component in one embodiment. FIG. 6 is a flow diagram illustrating the overall processing of the WSDL import component in one embodiment. The component is passed a WSDL document and populates the service mapping. In block 601, the component invokes the create web service record component to create a web service record for the passed WSDL document. In block 603, the component invokes the create port records component to create the port records associated with the passed WSDL document. In block 603, the component invokes the create service-related records component to create records for the service, the method, and the argument tables. The component then completes.

Figure 7:
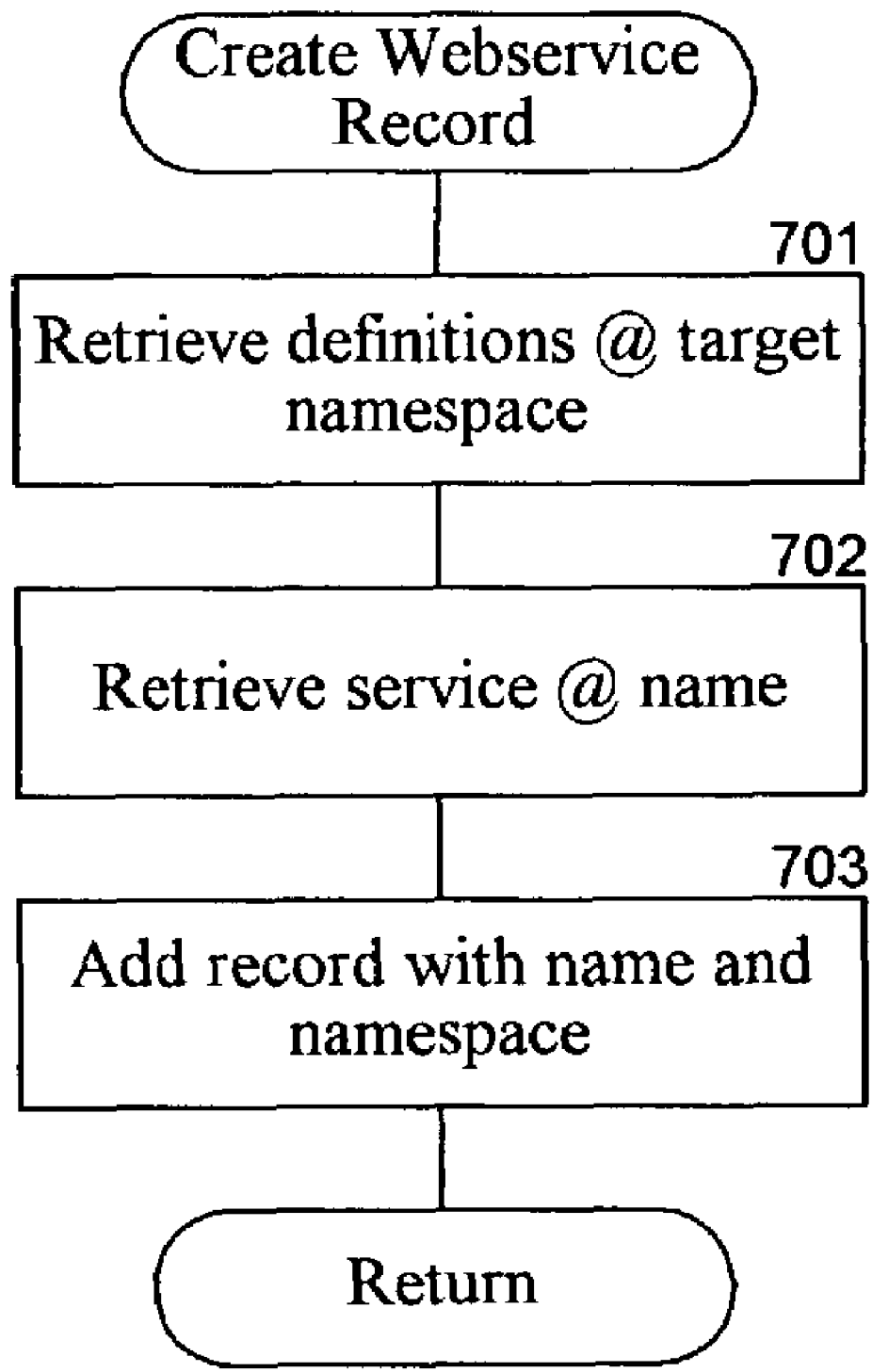
FIG. 7 is a flow diagram illustrating the processing of the create web service record component in one embodiment.

FIG. 7 is a flow diagram illustrating the processing of the create web service record component in one embodiment. In block 701, the component retrieves the targetnamespace attribute of the definitions tag of the passed WSDL document. In block 702, the component retrieves the name attribute of the service tag of the passed WSDL document. In block 703, the component adds a record to the web service table with a name field and namespace field set according to the retrieved attributes. The component then returns.

Figure 8:
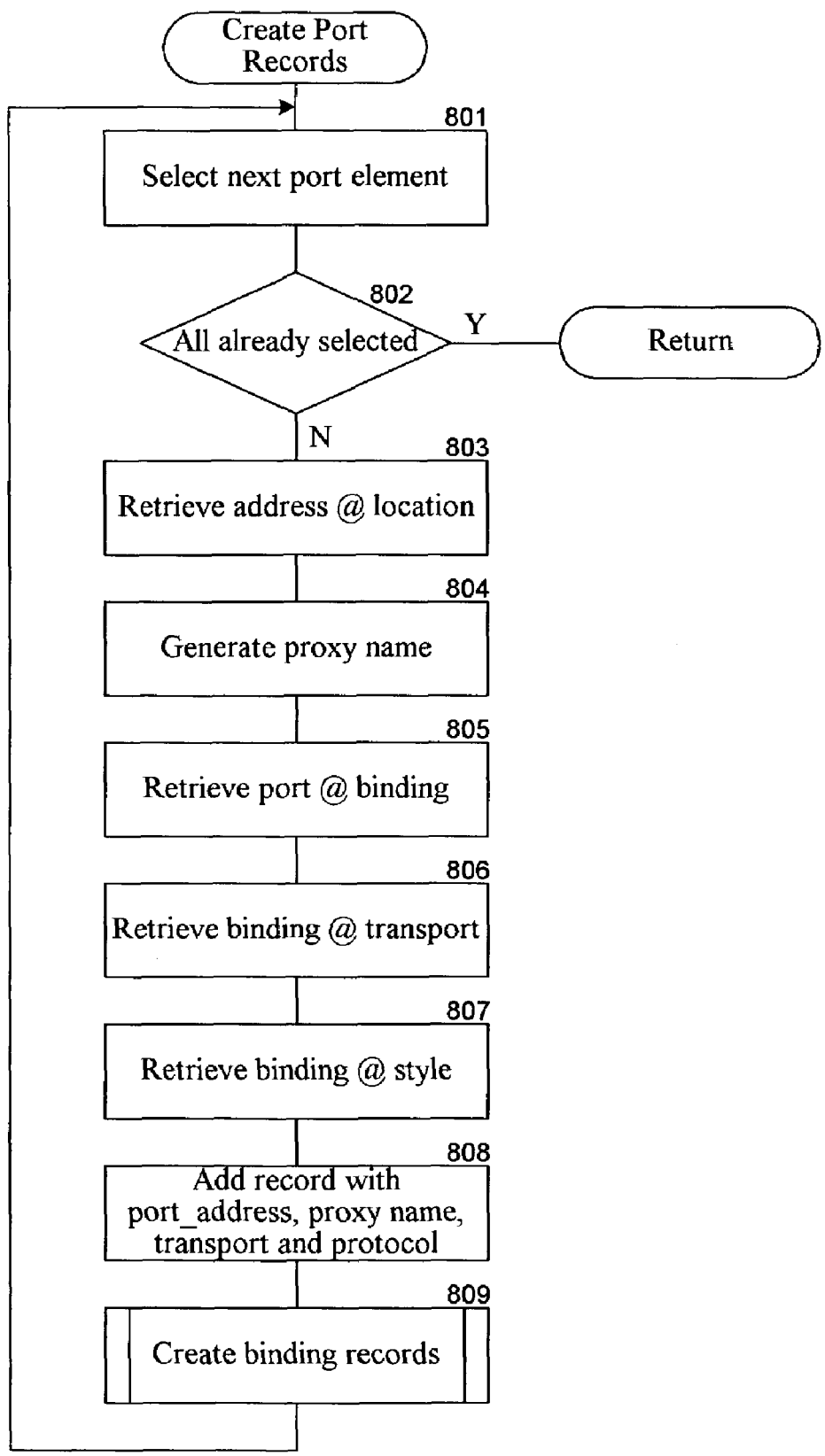
FIG. 8 is a flow diagram illustrating the processing of a create port records component in one embodiment.

FIG. 8 is a flow diagram illustrating the processing of a create port records component in one embodiment. In block 801, component selects the next port element of the WSDL document. In decision block 802, if all the port elements have already been selected, then the component returns, else the component continues at block 803. In block 803, the component retrieves the location attribute of the address element of the WSDL document. In block 804, the component generates a unique name for the service. In block 805, the component retrieves the binding attribute of the port element of the passed WSDL document. In block 806, the component retrieves the transport attribute of the binding element of the passed WSDL document. In block 807, the component retrieves the style attribute of the binding element of the passed WSDL document. In block 808, the component adds a record with a port address, service name, transport mechanism, and communications protocol initialized according to the retrieved attributes. In block 809, the component invokes the create binding records component to create the binding records for the selected port. The component then loops to block 801 to select the next port.

Figure 9:
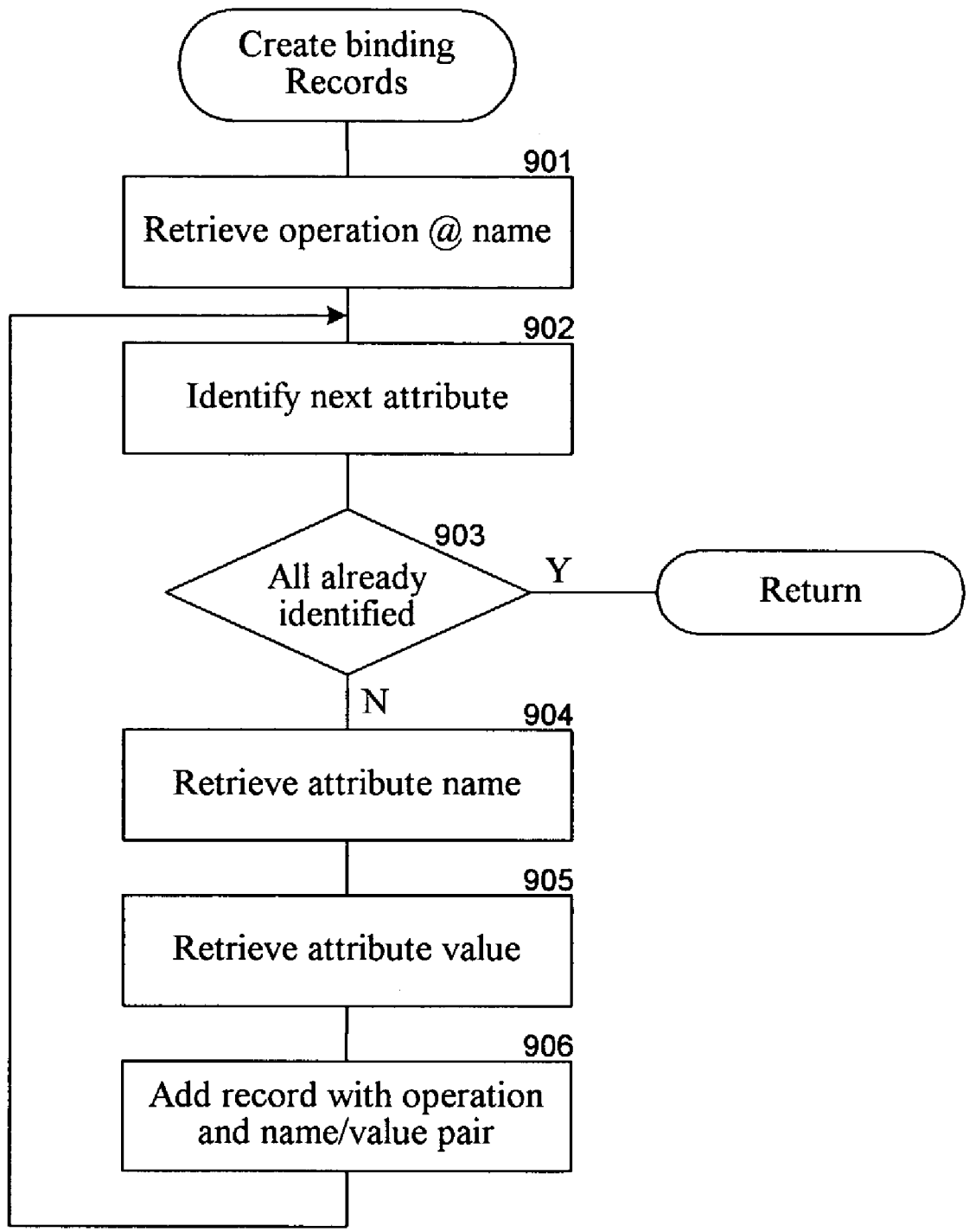
FIG. 9 is a flow diagram illustrating the processing of a create binding records component in one embodiment.

FIG. 9 is a flow diagram illustrating the processing of a create binding records component in one embodiment. In block 901, the component retrieves the name attribute of the operation element of the passed WSDL document. In block 902, the component identifies the next attribute associated with the binding information of the passed WSDL document. In decision block 903, if all the attributes have already been identified, then the component returns, else the component continues at block 904. In block 904, the component retrieves the name of the identified attribute. In block 905, the component retrieves the value of the identified attribute. In block 906, the component adds a record with the operation and name value pair to the binding table and then loops to block 902 to identify the next attribute.

Figure 10:
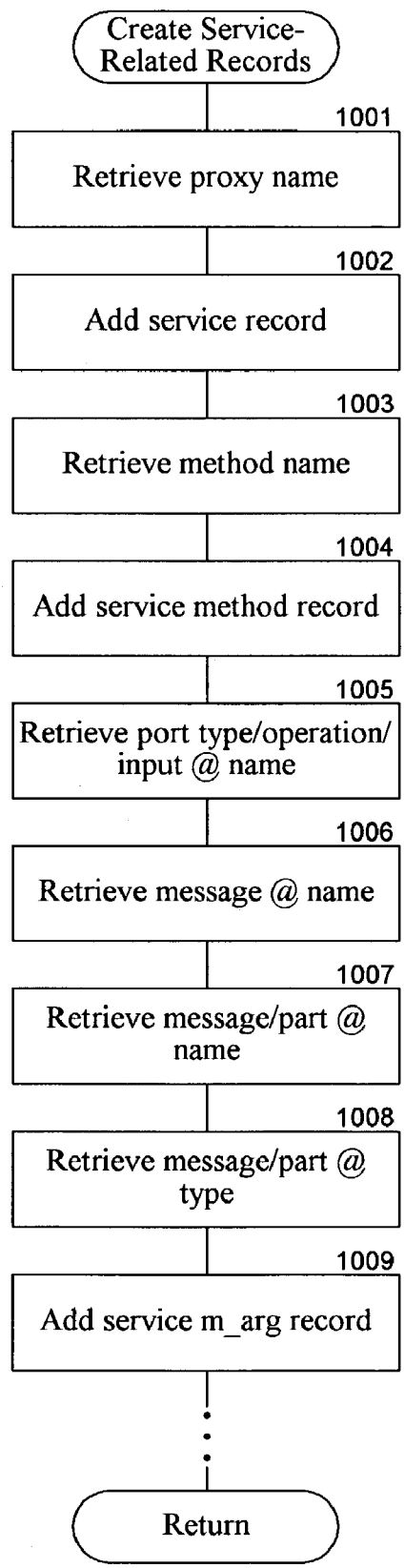
FIG. 10 is a flow diagram illustrating the processing of the create service-related records component in one embodiment.

FIG. 10 is a flow diagram illustrating the processing of the create service-related records component in one embodiment. In block 1001, the component retrieves the service name that was generated when the port record was created. In block 1002, the component adds a service record to the service table. In block 1003, the component retrieves the method name. In block 1004, the component adds a record to the method table containing the retrieved method name. In block 1005, the component retrieves the name attribute within the porttype/operation/input elements of the passed WSDL document. In block 1006, the component retrieves the name attribute of the message element of the passed WSDL document. In block 1007, the component retrieves the name attribute of the message/part element of the passed WSDL document. In block 1008, the component retrieves the type attribute of the message/part element of the passed WSDL document. In block 1009, the component adds an argument record to the argument table. As indicated by the ellipsis, the component continues processing the additional argument information defined by the passed WSDL document.

From the foregoing, it will be appreciated that although specific embodiments of the technology have been described herein for purposes of illustration, various modifications may be made without deviating from the spirit and scope of the invention. For example, the technology may be used for client applications to invoke any type of service implemented by server applications and is not linked to "business services." An example of a non-business service might be a word processing application that uses a grammar checking service implemented by a server application. One skilled in the art would also appreciate that the mapping of web service and port to communications information (e.g., communications protocol and transport mechanism) can be dynamically changed during execution of a client application. For example, an administrator may manually update the port table to indicate a new protocol and transport mechanism. In such a case, the client application would use the updated communications information next time the business service proxy is invoked. Accordingly, the invention is not limited except by the appended claims.

We claim:

1. A method implemented by a computer system, the method comprising:
   receiving arguments associated with a business service call, wherein the arguments comprise an identification of the business service, a method of the business service to be invoked, and one or more arguments of the method;
   accessing metadata that describes how to convert the business service call to a web service call;
   generating an invocation request for the web service using the metadata and the arguments; and
   invoking the web service call by transmitting the generated request to the web service, wherein
      said transmitting is performed in accordance with the provided metadata.

2. The method of claim 1 wherein the provided metadata includes a mapping from the web service to communications information for the web service.

3. The method of claim 2 wherein the communications information includes communications protocol information.

4. The method of claim 2 wherein the communications information includes transport information.

5. The method of claim 1 wherein the provided metadata includes marshaling information describing how to marshal an invocation of a business service into an invocation of a web service.

6. The method of claim 5 wherein the marshaling information includes an indication of how to convert parameters.

7. The method of claim 1 wherein the provided metadata includes marshaling information describing how to marshal an invocation of a business service into an invocation of a web service and a mapping from the web service to communications information for the web service.

8. A method implemented by a computer system, the method comprising:
   providing a first mapping of a web service and port to communications information;
   providing configuration information comprising one or more web service name and port name pairs each associated with a respective client application;
   receiving a request to invoke a function of a service from a first client application, wherein
      the request comprises a service name, a name of a method to invoke, and one or more input arguments for the method;
   retrieving an identification of a web service and port associated with the received request from the configuration information associated with the first client application;
   retrieving the communications information mapped to the identified web service and port; and
   sending to a server that provides the identified web service a request to perform the service, wherein
      the request is sent in accordance with the retrieved communications information,
      the server is identified by the communications information, and
      the provided first mapping is customized to control the sending of the request to a server.

9. The method of claim 8 wherein the communications information includes a specification of a communications protocol.

10. The method of claim 8 wherein the communications information includes a specification of a transport mechanism.

11. The method of claim 8 wherein the communications information includes a specification of an address of the server.

12. The method of claim 8 wherein the request includes actual input arguments to be passed to the service.

13. The method of claim 12 further comprising:
   formatting the actual input arguments in accordance with the retrieved communications information.

14. The method of claim 13 further comprises:
   providing a second mapping of services to formats of actual input arguments, wherein said formatting includes retrieving the second mapping for the requested service.

15. The method of claim 8 wherein the server application and first client application execute on different computer systems.

16. The method of claim 8 wherein the first client application invokes a genenc proxy to request invocation of functions of services.

17. The method of claim 14 wherein the second mapping comprises:
   a mapping of a web service to a plurality of ports including, for each port, a specification of communications information, a specification of a service, a function of that service, and an argument for that function.

18. The method of claim 17 wherein the second mapping includes binding information for a communications protocol.

19. The method of claim 17 wherein the second mapping includes binding information for a transport mechanism.

20. The method of claim 17 wherein the second mapping indicates a type of an argument and the sending of the request includes marshaling an actual argument in accordance with the type.

21. The method of claim 8 wherein the service is provided by a server application that executes on the same computer system as the first client application.

22. The method of claim 8 wherein the server is local to the first application that requests a service to invoke the function.

23. The method of claim 8 wherein the first mapping is updated to map to different communications information during execution of the first client application.

24. The method of claim 23 wherein future requests received from the first client application use the updated communications information.

25. The method of claim 8 further comprises:
updating communications information of the web service of the first mapping during execution of the first client application.

26. The method of claim 8 wherein the first mapping is customized during execution of the first client application.

27. A computer system for invoking a server from a client, comprising:
means for mapping a web service to communications information associated with the web service;
means for receiving from the client a request to invoke a function of a service, wherein
the request comprises a service name, a name of a method to invoke, and one or more input arguments for the method;
means for retrieving an indication of a web service associated with the received request from configuration information associated with the client, wherein
the configuration information comprises one or more web service names each associated with a respective client application;
means for retrieving communications information associated with the indicated web service; and
means for sending to the server that provides the indicated web service a request to perform the service, wherein
the request being sent in accordance with the retrieved communications information, and
the server is identified by the communications information.

28. The system of claim 27 wherein the communications information includes a specification of a communications protocol and a transport mechanism.

29. The system of claim 27 wherein the request includes actual input arguments to be passed to the service.

30. The system of claim 27 wherein the server and client execute on different computer systems.

31. The system of claim 27 wherein the client invokes a generic proxy to request invocation of functions of services.

32. The system of claim 27 further comprises:
means for mapping of a web service to a plurality of ports, wherein
the mapping comprises for each port a specification of communications information, a specification of a service, a function of that service, and an argument for that function, and
means for retrieving an indication of a port associated with the request and retrieved communications information that is additionally associated with the retrieved port.

33. The system of claim 32 wherein the mapping includes binding information for a communications protocol.

34. The system of claim 32 wherein the provided mapping includes binding information for a transport mechanism.

35. The system of claim 32 wherein the mapping indicates a type of an argument and the sending of the request includes marshaling an actual argument in accordance with the type.

36. The system of claim 27 further comprising:
means for updating the communications information associated with the web service during execution of the client.

37. A computer-readable storage medium comprising instructions for controlling a computer system to invoke a service by a method comprising:
providing configuration information comprising one or more web service name and port name pairs each associated with a respective client application;
retrieving an indication of a web service and port associated with a request to invoke a function of a service from the configuration information associated with a first client application providing the request;
retrieving communications information associated with the indicated web service and port; and
sending to a server that provides the indicated web service a request to perform the service, wherein
the request is sent in accordance with the retrieved communications information,
the server is identified by the communications information, and
if the web service associated with the received request is changed, then different communications information is retrieved.

38. The computer-readable medium of claim 37 wherein the communications information includes a specification of a communications protocol.

39. The computer-readable medium of claim 37 wherein the communications information includes a specification of a transport mechanism.

40. The computer-readable medium of claim 37 wherein the communications information includes a specification of an address of the web server.

41. The computer-readable medium of claim 37 wherein the request includes actual input arguments to be passed to the service.

42. The computer-readable medium of claim 37 wherein the request to invoke is received from a client application and the indicated web service is provided by a server application.

43. The computer-readable medium of claim 42 wherein the client application invokes a generic proxy to request invocation of functions of services.

44. The computer-readable medium of claim 37 further comprising instructions for controlling the computer system to provide a mapping of a web service to a plurality of ports, the mapping including for each port a specification of communications information and including for each port a specification of a service, a function of that service, and an argument for that function.

45. The computer-readable medium of claim 44 wherein the provided mapping includes binding information for a transport mechanism.

46. The computer-readable medium of claim 44 wherein the provided mapping indicates a type of an argument and the sending of the request includes marshaling an actual argument in accordance with the type.

* * * * *